3,066,102
FERRITE CONTAINING NEODYMIUM

Oskar Eckert, Lauf (Pegnitz), Germany, assignor to Steatit-Magnesia Aktiengesellschaft, Lauf (Pegnitz), Germany
No Drawing. Filed Dec. 19, 1957, Ser. No. 703,758
1 Claim. (Cl. 252—62.5)

This invention relates to manganese-zinc-ferrite compositions having improved magnetic properties and to the method of making such compositions and is a continuation-in-part of copending application Serial No. 485,627, filed February 1, 1955, now abandoned.

Ferrites in the sense of the invention herein described comprise compositions of the general formula $$x(Mn^{+2}Zn^{+2})O \cdot yFe_2O_3$$

wherein the Mn-oxide:Zn-oxide ratio may be optionally determined. These compositions have the properties of (a) possessing the crystalline structure of the spinels and (b) being ferro-magnetic.

In order that the formation of the spinel is possible the relation $x/y$ must not go below nor above certain values. Generally, the ratio $x/y$ should be maintained between 0.5 and 2.0.

Because of their magnetic properties ferrites find many applications in electronics, preferably for the manufacture of magnetic cores for communication, radio and television techniques.

The manufacture of such ferrites follow well known ceramic processes which comprises intimate mixing and pulverizing Mn—Zn—Fe compositions. These compositions are then fired in reducing, oxidizing or neutral atmospheres. By varying the heating and cooling speeds and certain optimum temperatures the metal compositions are converted into oxides and form the desired ferrite. These techniques are well known to those skilled in the art.

Whether or not portions of the entire material are first subjected to a fritting, firing and then well combined and fired to maturity together is immaterial as to the present invention. It is further immaterial whether or not the ferrite is obtained from the melt. It is also known that every possible ferrite thus produced is bound to certain definite values with respect to its magnetic properties, for instance, the initial permeability, maximum permeability, saturation magnetization, residual magnetism, coercive force, quality of high frequency and the Jordan loss constant, which may not be exceeded.

The present invention consists in improving the magnetic properties of the known Mn—Zn ferrites, in particular the initial permeability, the maximum permeability and the Jordan loss constant by adding to the prepared mixture for the formation of a particular ferrite minute quantities, i.e., effective quantities below 1 mol percent of the total mixture, of compositions of the chemical elements specifically defined as rare earths with atomic numbers 57–71 of the periodic system. Compositons especially suitable in accordance with the invention are the oxides or combinations which are converted into oxides during firing, for example, oxide-hydrate, carbonates, acetate, formate, etc. Thus, by way of example, the initial permeability of the molar manganese-zinc-ferrite by the additon of 0.1 mol percent of the total mixture of neodymium oxide may be raised to more than double the value than is obtained with the same mixture, same method of preparation, same firing with the pure molar manganese zinc ferrite.

The rare earths particularly suitable for the improvement of the magnetic properties as described in the invention are the elements lanthanum, cerium, praseodymium and neodymium. The introduction of these minute additions as described in the invention does not represent an additional ferrite component made up of the rare earth compositions and one of the other components of the mixture in the sense of a new mixed ferrite; but it represents a solid solution.

Rare earth oxides and rare earth compositions which convert into oxides during combustion, for instance, carbonate, oxalate, etc., are added in powder form to the raw or presintered ferrite mixture. According to a further method rare earth compositions, for instance, cerium nitrate, cerium acetate as aqueous solution are ground together with the raw or presintered ferrite mixture and the solvent is then vaporized. During the process of mixing no heat is applied. This mixing must continue until a homogeneous distribution is obtained. In general, the mixing takes from four to six hours. A wet mix should be employed.

SPECIFIC EXAMPLES

Example I

The following basic mixture is compounded:

50 mol percent $Fe_2O_3$
25 mol percent ZnO
25 mol percent MnO (here an equivalent amount of $Mn_2O_3$ is used)

To this basic mixture 0.05 mol percent $Nd_2O_3$ is added by mixing in the prescribed manner relative to the molar basic mixture ($Fe_2O_3+ZnO+MnO$). From this mixture, thereupon, by using a specific pressure of 700 kg. per cm.$^2$, rings with a dimension of 59 mm. outside diameter, 35 mm. inside diameter and 10 mm. height, are pressed. The sintering of these rings then takes place at a temperature of 1350 °C., for two hours in normal atmosphere. The rings are normally cooled in the oven and then provided with a winding of 0.4 mm. enamel copper wire which has twenty-eight turns.

The measured initial permeability $\mu_a$ gave a value of 2200. If in place of 0.05 mol percent 0.010/0.25 or 0.5 mol percent $Nd_2O_3$ is added, the initial permeability gives the values 1850/1550/1100. With larger amounts than 1.0 mol percent $Nd_2O_3$ a decrease of $\mu_a$ below 1100 takes place.

As a comparison with these values, rings which contain no $Nd_2O_3$ but consist merely of the basic mixture (50 mol percent $Fe_2O_3$, 25 mol percent ZnO, 25 mol percent MnO), gave a value for $\mu_a$ of 1100. This shows that the addition of 0.05 mol percent $Nd_2O_3$ to the basic mixture results in an improvement of the initial permeability of one hundred percent.

Example II

Basic mixture as in Example I. 0.01 mol percent $Ce_2O_3$ added. Mixing, sintering and testing as in Example I. Measured: $\mu_a=1270$.

Example III

Basic mixture as in Example II, but 0.05 mol percent $Ce_2O_3$. Measured: $\mu_a=1900$.

Example IV

Basic mixture as in Example II, but 0.10 mol percent $Ce_2O_3$. Measured: $\mu_a=1870$.

Example V

Basic mixture as in Example II, but 0.20 mol percent $Ce_2O_3$. Measured: $\mu_a = 1685$.

Example VI

Basic mixture as in Example II, but 0.50 mol percent $Ce_2O_3$. Measured: $\mu_a = 1500$.

Example VII

Basic mixture as in Example II, but 0.10 mol percent $La_2O_3$. Measured: $\mu_a = 1625$.

The most favorable percentage of rare earth is about 0.05 mol percent. As can be seen from the above examples a percentage under 0.05 is also effective, but results in a somewhat small improvement of the initial permeability. Values above 0.05 mol percent again decrease permeability, but it has been found that desirable results are obtained as long as the amount of rare earth does not exceed 1 mol percent.

I claim:

A ferrite mixture consisting essentially of 0.02 and 1.0 mol percent of neodymium oxide and a compound of the formula $x(Mn^{+2}Zn^{+2})O.yFe_2O_3$ where the ratio $x/y$ is between 0.5 and 2.0.

References Cited in the file of this patent

UNITED STATES PATENTS

| | | |
|---|---|---|
| 1,976,230 | Kato et al. | Oct. 9, 1934 |
| 2,549,089 | Hegyi | Apr. 17, 1951 |
| 2,565,861 | Leverenz et al. | Aug. 28, 1951 |
| 2,576,456 | Harvey et al. | Nov. 27, 1951 |
| 2,636,860 | Snoek et al. | Apr. 29, 1953 |
| 2,677,663 | Jonker et al. | May 4, 1954 |
| 2,715,109 | Albers-Schoenberg | Aug. 9, 1955 |

FOREIGN PATENTS

| | | |
|---|---|---|
| 737,284 | Great Britain | Sept. 21, 1955 |
| 763,494 | Great Britain | Dec. 12, 1955 |
| 1,107,654 | France | Aug. 10, 1955 |
| 1,122,258 | France | May 22, 1956 |

OTHER REFERENCES

Harvey et al.: RCA Review Setember 1950, pages 344–346.

Maxwell et al.: Physical Reviews, vol. 96, pp. 1501–1504, Dec. 15, 1954.

Economos: J. Amer. Ceramic Soc., vol. 58, page 242, July 1955.